United States Patent [19]

Goto et al.

[11] Patent Number: 5,456,049
[45] Date of Patent: Oct. 10, 1995

[54] WINDOW MOLDING FOR AUTOMOBILES

[75] Inventors: Shinichi Goto; Chiaki Komiyama; Masao Kobayashi; Isao Ito, all of Inazawa, Japan

[73] Assignee: Toyoda Gosei Co., Ltd., Nishikasugai, Japan

[21] Appl. No.: 171,767

[22] Filed: Dec. 22, 1993

Related U.S. Application Data

[63] Continuation of Ser. No. 791,768, Nov. 15, 1991, abandoned.

[30] Foreign Application Priority Data

Nov. 17, 1990 [JP] Japan ................................. 2-312489
Nov. 17, 1990 [JP] Japan ................................. 2-312490
Jun. 28, 1991 [JP] Japan ................................. 3-158032

[51] Int. Cl.$^6$ .............................. E06B 3/00; E04C 2/38
[52] U.S. Cl. ........................................ 52/208; 52/716.5
[58] Field of Search .................................. 52/208, 716.5, 52/716.6; 296/84 R, 93

[56] References Cited

U.S. PATENT DOCUMENTS

| | | |
|---|---|---|
| 4,174,901 | 12/1990 | Katayama . |
| 4,968,543 | 11/1990 | Fujioka et al. . |
| 4,974,001 | 12/1990 | Katayama ........................ 52/716 |
| 5,070,590 | 12/1991 | Fujioka et al. . |
| 5,078,444 | 1/1992 | Shirahata et al. ................. 52/400 |
| 5,114,206 | 5/1992 | Yada ................................. 296/93 |

FOREIGN PATENT DOCUMENTS

| | | |
|---|---|---|
| 52-72218 | 5/1977 | Japan . |
| 53-136721 | 10/1978 | Japan . |
| 57-139422 | 8/1982 | Japan . |
| 61-138710 | 8/1986 | Japan . |
| 61-161113 | 10/1986 | Japan . |
| 62-54810 | 4/1987 | Japan . |
| 62-280019 | 12/1987 | Japan . |
| 62-283017 | 12/1987 | Japan . |
| 63-44815 | 3/1988 | Japan . |
| 63-291721 | 11/1988 | Japan . |
| 1-153325 | 6/1989 | Japan . |
| 1-223018 | 9/1989 | Japan . |
| 2-124315 | 5/1990 | Japan . |

*Primary Examiner*—Carl D. Friedman
*Assistant Examiner*—Kien Nguyen
*Attorney, Agent, or Firm*—Cushman, Darby & Cushman

[57] ABSTRACT

A window molding for automobiles has an elongate leg fitted into a gap between a perimeter of a front window glass and a window frame. The molding holds the perimeter of the front window glass between an inner support and an outer support. A head is disposed at one end of the leg, the head having a lateral portion thereof extending over the outer support. A guide connects the lateral portion of the head and the outer support, the guide defining a distance between the lateral portion of the head and the outer support and being deformed according to a respective position along the perimeter of the front window glass. A guide groove is defined at least in part by the guide and opened toward the front window glass at least at side edges of the front window glass. A veil lip is disposed on the lateral portion of the head and forms an obtuse angle therewith at least at the side edges of the front window glass so that the veil lip extends toward the front window glass and defines another part of the guide groove. The guide is deformed at the upper edge of the front window glass to shorten the distance between the lateral portion of the head and the outer support so that the veil lip has a portion thereof bearing on the front window glass along the upper edge of the front window glass.

9 Claims, 11 Drawing Sheets

WINDOW MOLDING FOR AUTOMOBILES

This is a continuation of application Ser. No. 07/791,768, filed on Nov. 15, 1991, which was abandoned upon the filing hereof.

BACKGROUND OF THE INVENTION

1. Field of the Invention

This invention relates generally to window moldings, and more particularly to automobile window moldings which are fitted into a gap between the window glass and a window frame.

2. Description of the Art

Window moldings for automobiles are disclosed in several publications such as Japanese Laid Open Patent Publication No. 1-223018, Japanese Laid Open Patent Publication No. 63-291721, and Japanese Laid Open Utility Model Publication No. 63-44815.

FIG. 18 and FIG. 19 respectively show the construction of a window molding fitted into a gap between a front window glass and a window frame of an automobile. FIG. 20 and FIG. 21 respectively show a conventional window molding for automobiles which is disclosed in the Japanese Laid Open Patent Publication No. 1-223018. FIG. 20 illustrates a section of a vertical member taken along line XXII—XXII of FIG. 19, and FIG. 21 illustrates a section of a horizontal member taken along lines XXI—XXI of FIG. 19.

The window molding of FIGS. 18 and 19 is molded of a synthetic resin material into an elongate shape, and is composed of a pair of vertical members V and a horizontal member H. The vertical members V are fitted into gaps between the edges of a front window glass 1 and a window frame 2 respectively. The horizontal member H is fitted into a gap between an upper edge of the glass 1 and the frame 2. Generally, the vertical members V protrude outwardly from a front surface of the window glass 1 more so than the horizontal member H so that rainwater swept by a wiper 6 does not overflow onto the automobile's side windows.

Each vertical member V of the conventional window molding is made up of a long size leg 71 and a head 72, as shown in FIG. 20. The long size leg 71 is inserted into the gap between the right or left edge of the front window glass 1 and the window frame 2, while the head 72 covers the gap. The leg 71 has a first support 73 that supports a rear surface of a perimeter of the glass 1. Separately molded auxiliary molding 75 is inserted into a gap between the head 72 and the glass 1 in order to prevent deformation of the head 72. The leg 71 is secured to the window frame 2 via an adhesive 5 as shown.

Similarly, a horizontal member H is composed of a short size leg 76 and a head 72, as shown in FIG. 21. The short size leg 76 is inserted into the gap between the upper edge of the window glass 1 and the frame 2, while the head 72 veils the gap. The short size leg 76 is formed by cutting a leading end of the long size leg 71 of the vertical member V along a line 77 of FIG. 20. Thus the short size leg 76 has a second support 78 which sustains the peripheral rear surface of the window glass 1. The head 72 is molded into the same shape as that of the vertical member V. The leg 76 is fixed to the window frame 2 via an adhesive 5 at a front edge of a roof of the car body.

With the conventional window molding constructed as above, the vertical members V have the first supports 73 of the long sized legs 71 holding the window glass 1, while the auxiliary moldings 75 are fitted between the window glass 1 and the heads 72. Thereby, the heads 72 of the vertical member V are disposed from the front surface of the window glass 1 at a higher position than that of the horizontal member H.

Accordingly, it is possible to direct rainwater swept by the wiper 6 downward along the auxiliary moldings 75, thereby preventing the rainwater from overflowing onto the driver's side window 3.

Publications 63-291721 and 63-44815 respectively disclose window moldings for automobiles which can vary heights of the heads between vertical members and a horizontal member. The height is varied by changing positions of legs holding the window glass, substantially in the same manner as the above described moldings.

However, with the above mentioned window moldings of the prior art, it is necessary to assemble or attach the auxiliary moldings 75, which are separately molded, to the vertical members V. Therefore, the number of parts as well as processes are increased, thus making production costs higher. Moreover, since the short size leg 76 of the horizontal member H is produced by cutting the leading end of the long size leg 71 of the vertical member V, there is substantial waste of material. Furthermore, glass side end faces of the auxiliary molding 75 and the head 72 are positioned substantially on the same plane to make one generally flat surface. As a result, the auxiliary molding 75 cannot effectively block rainwater and the like so that it will flow downward rather than splash onto the side windows 3 when being swept by the wiper 6. The rainwater which is wiped then obstructs the view of a driver, makes the side window 3 dirty and makes the driver and others uncomfortable.

FIGS. 22 and 23 show another conventional window molding for automobiles.

FIG. 22 illustrates a section of a vertical member of the window molding, while FIG. 23 shows a section of one of the horizontal members.

As shown in FIGS. 22 and 23, vertical members V have their heads 81 protruding more than head 91 of a horizontal member H from the front surface of the window glass 1. Thus, rainwater swept by the wiper 6 is prevented from overflowing onto the side window 3. Further, each head 81 of the vertical member V has a guide groove 82 at its glass side so as to drain the rainwater downward along the right and left edges of the window glass 1. On the other hand, the head 91 of the horizontal member H has a substantially plate-like shape to enhance the aerodynamic characteristics of the automobile. Head 91 is smoothly contoured from the front surface of the window glass 1 to an upper surface 2a of the window frame 2 which forms a front margin of a roof 4 of the car body. The heads 81 and 91 of the member V and H respectively have seal lips 82 and 92 at their frame side. The seal lips 82 and 92 are elastically contacted with the upper surface 2a of the frame 2 so as to close the gap between the window glass 1 and the frame 2.

In the above mentioned window molding, the vertical members V and the horizontal member H have different heights from the glass 1 and different cross sections. Therefore, the vertical member V and the horizontal member H are usually molded separately by extrusion. Joint members are additionally molded by injection and used to connect the vertical members V and the horizontal member H.

Japanese Laid Open Utility Model Publication No. 53-136721 discloses a conventional window molding for automobiles that is constructed as described above.

Japanese Laid Open Utility Model Publications No. 52-72218, No. 57-139422, No. 61-161113 and No. 62-54810 respectively show still another type of window molding for automobiles. Namely, the window molding has a guide groove, at its frame side, that is successively formed along a horizontal member and vertical members fitted on a front or rear window glass. The guide groove serves to lead and drain rainwater from a roof of a car body downward along right and left edges of the window glass. In these window moldings, the vertical members are formed into a section that is the same as the horizontal member.

There has also been proposed a window molding for automobiles that can guide and drain rainwater flowing from a window glass toward a window frame as well as rainwater flowing from the frame toward the glass, downward along the edges of the window glass. For example, Japanese Laid Open Patent Publication No. 1-153325 discloses this type of window molding. The window molding of the above publication has its vertical members and horizontal member provided with substantially plate-shaped heads and which is continuously placed on the front surface of the window glass. Guide grooves are formed between the heads and a window frame. Similarly, Japanese Laid Open Utility Model Publication No. 61-138710 shows a window molding for automobiles in which a lip extends slantingly from a gap between a rear window glass and a window frame toward the window frame. In this molding, there is provided two guide grooves, one facing the rear window glass and the other facing the window frame.

Generally, it is preferable that the horizontal member of a window molding does not substantially protrude outwardly from the front surface of the window glass so as to form a continuous surface in view of the aerodynamic characteristics of a car. In contrast, vertical members preferably protrude sufficiently from the front surface of the window glass in order to adequately prevent the rainwater from overflowing onto side windows.

The window molding of the Publication No. 1-153325 has substantially the same section along its full length, and the vertical members protrude only slightly from the surface of the front window glass so as to form a continuous surface therewith. Thereby, the rainwater runs over the vertical members onto the side window. The window molding of the Publication No. 61-138710, on the other hand, has the lip of the horizontal member substantially protruding from the surface of the front window glass. Therefore, the lip may increase air resistance and affect the aerodynamic characteristics of the car.

Normally, a window molding for automobiles is molded by extrusion into an elongate shape in consideration of production costs and the like. Accordingly, in view of the above, when the vertical members and horizontal members are formed by different sections, it is necessary to manufacture vertical members and a horizontal member separately, and thereafter join the vertical members and the horizontal member via another separately molded joint. This results in an increase of the number of parts used and an increase in the amount of time required in production and assembling, thereby increasing manufacturing costs.

SUMMARY OF THE INVENTION

In view of the above, it is an object of the invention to provide a window molding for automobiles that can easily be changed in height at right and left edges and an upper edge of a front window glass.

It is still another object of the invention to provide a window molding for automobiles that is able to reduce manufacturing costs.

It is still another object of the invention to provide a window molding for automobiles that keeps rainwater, windshield washer liquid, etc. from splashing onto side windows or the like which are disposed next to the front window glass.

It is still another object of the invention to provide a window molding for automobiles that effectively prevents rainwater from overflowing from the front window glass to the side windows and from the roof of the car body to the front window glass, without any deterioration of aerodynamic characteristics of the automobile.

In accordance with one preferred mode of the invention, there is provided a window molding for automobiles that has an elongated leg successively fitted into a gap between a perimeter of a front window glass and a window frame. An inner support is formed successively at one lateral end of the leg in order to sustain a rear surface of the front window glass. An outer support is formed successively at an other lateral end of the leg opposite to the inner support in order to hold a front surface of the front window glass. The inner support and the outer support sandwich the perimeter of the front window glass in cooperation. A head is formed successively at the other lateral end of the leg so as to face the outer support and cover the perimeter of the front window glass. A guiding member connects the inner support and the outer support. The guiding member is deformed according to positions of the perimeter of the front window glass so as to change a height of the head relative to the outer support. The guiding member constitutes a guide groove opening toward the front window glass at least at a position of the perimeter of the front window glass.

Preferably, the guiding member has a standard shape at right and left edges of the front window glass so that the height of the head become maximum relative to the outer support, and that the guide groove is constituted thereby. Further, the guiding member has a maximum deformed shape at an upper edge of the front window glass so that the height of the head becomes minimum relative to the outer support and that an outer surface of the head is continuous with the front surface of the front window glass.

Preferably, a seal lip is formed successively on the leg in a stepped manner relative to the head, and is elastically contacted with an inner surface of the window frame, thereby defining an outwardly opened conduit between the head and the window frame.

Further objects and advantages of the invention will be apparent from the following description, reference being had to the accompanying drawings, wherein preferred embodiments of the inventions are clearly shown.

DETAILED DESCRIPTION OF THE PREFERRED EMBODIMENTS

Figure 1:
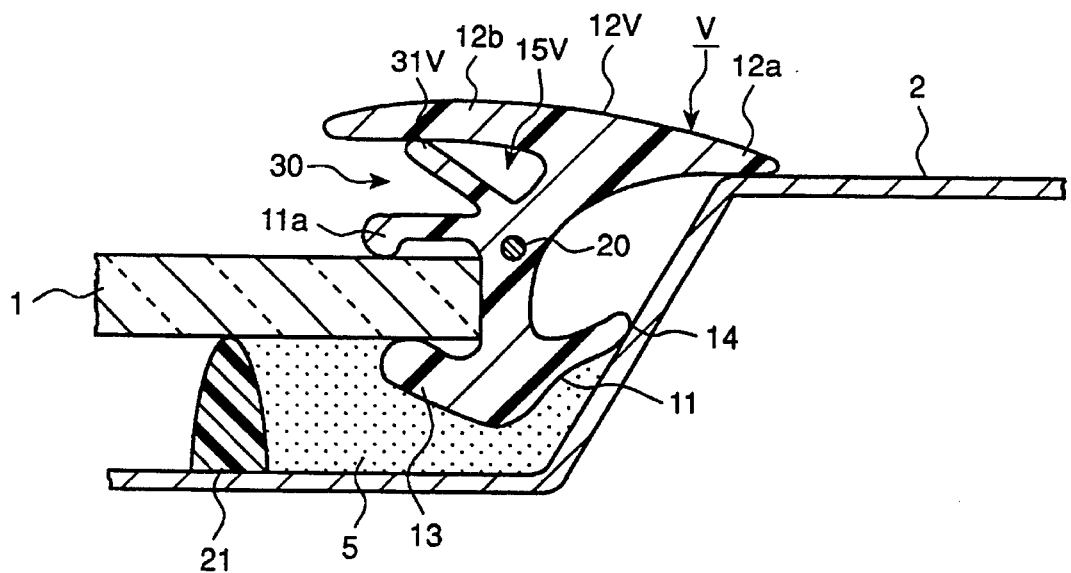
FIG. 1 is a cross sectional view of a vertical member of a first embodiment of an automobile window molding of the present invention in its assembled state.

Referring to the drawings, wherein like reference characters designate like or corresponding parts throughout the several views, several preferred modes of a window molding for automobiles of the invention will be described hereinafter.

Figure 2:
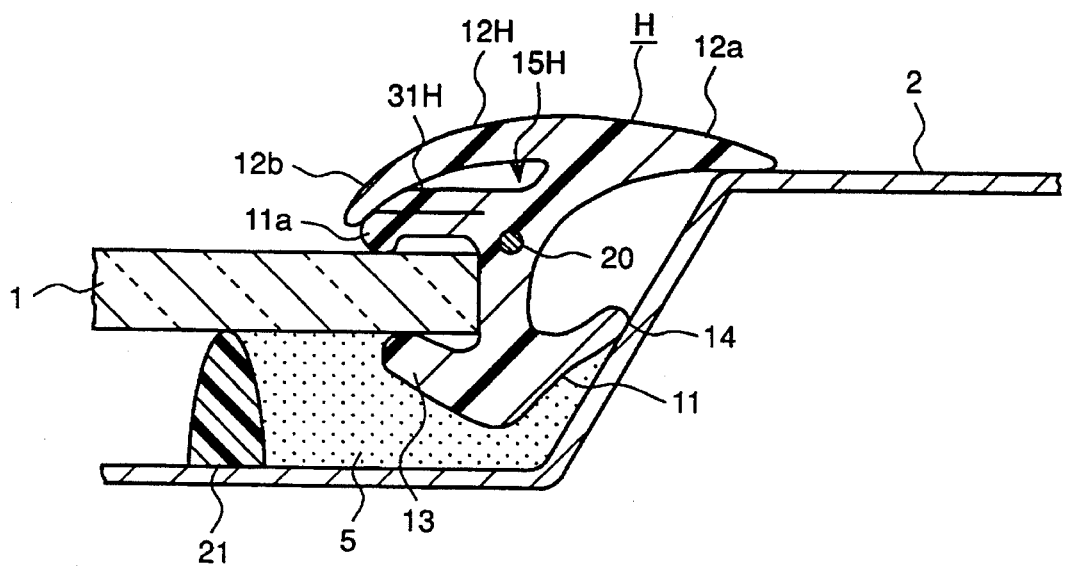
FIG. 2 is a cross sectional view of a horizontal member of a first embodiment of an automobile window molding of the present invention in its assembled state.
Figure 3:
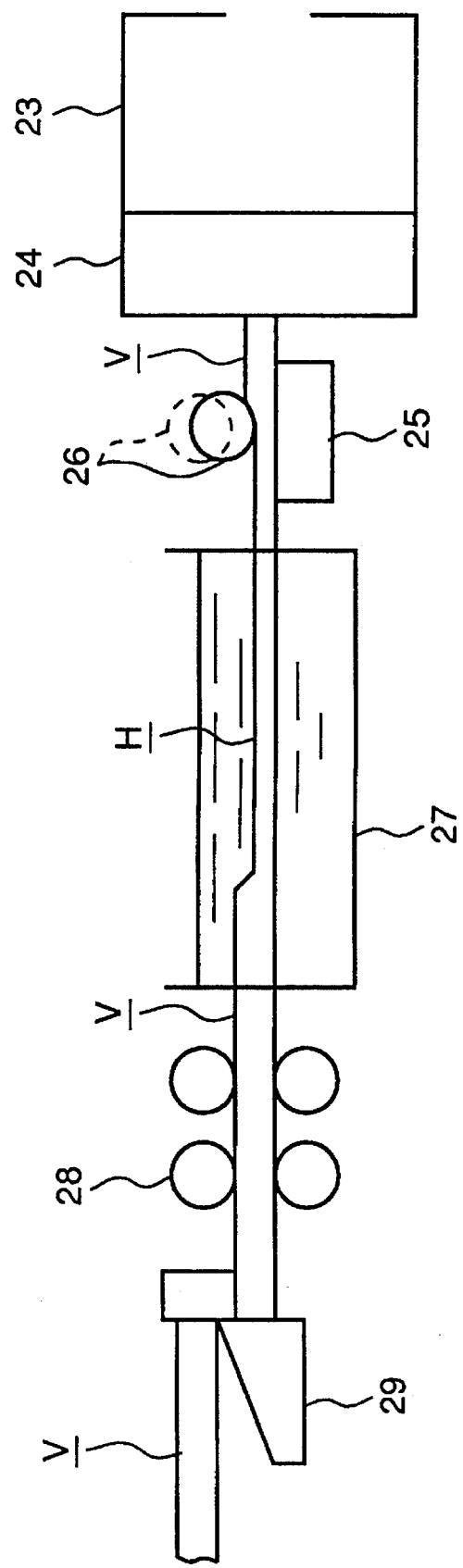
FIG. 3 is a schematic diagram showing a manufacturing process of an automobile window molding of the present invention.

FIG. 1 to FIG. 3 shows a first embodiment of a window molding of the present invention. FIG. 1 illustrates a section of an assembled vertical member. FIG. 2 illustrates a section of an assembled horizontal member. FIG. 3 illustrates a schematic diagram of the manufacturing process of the window molding. The same reference characters as used in the description of the prior art are now used to designate the same or corresponding parts.

Figure 19:
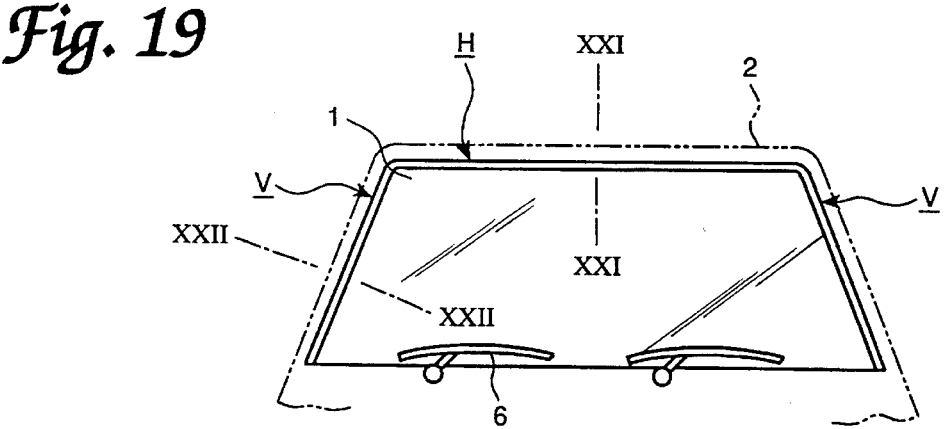
FIG. 19 is a plan view of a window molding for automobiles.
Figure 20:
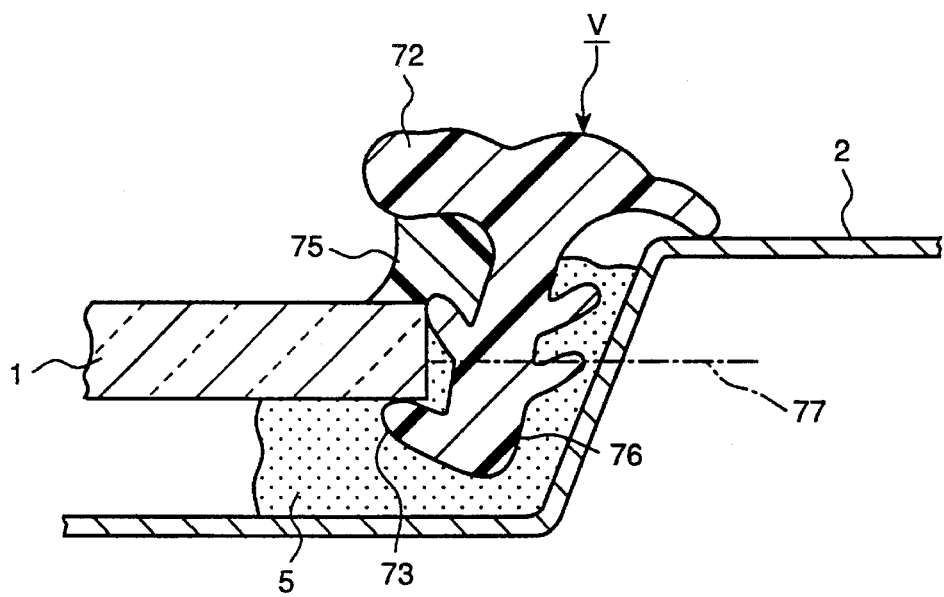
FIG. 20 is a cross sectional view, taken along lines XXII—XXII OF FIG. 19, showing a vertical member of a conventional window molding for automobiles.
Figure 21:
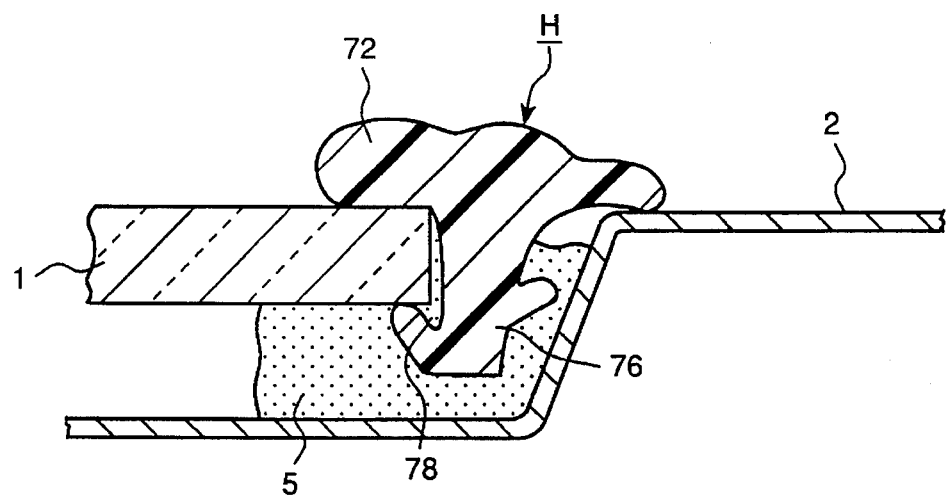
FIG. 21 is a cross sectional view, taken along lines XXI—XXI OF FIG. 19, showing a horizontal member of a conventional window molding for automobiles.
Figure 22:
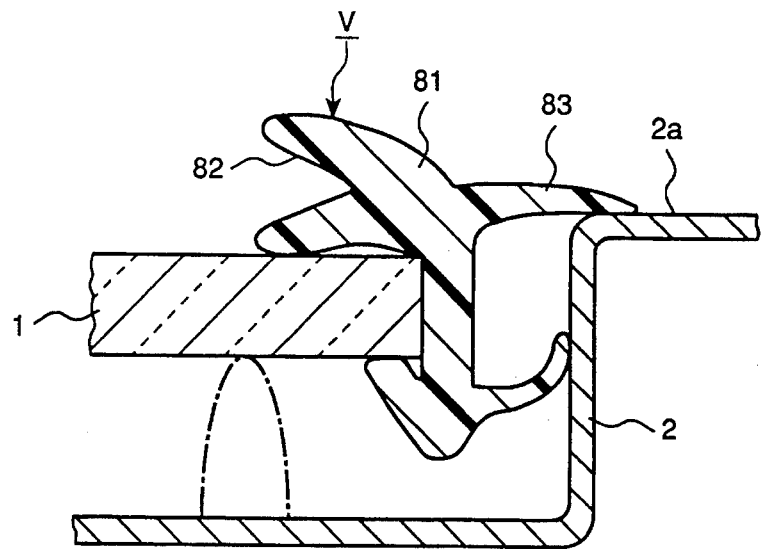
FIG. 22 is a cross sectional view of a horizontal member of another conventional window molding for automobiles.
Figure 23:
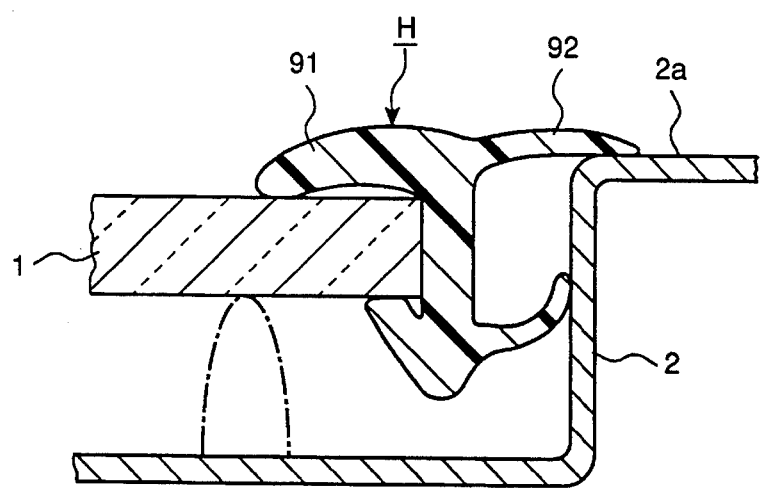
FIG. 23 is a cross sectional view of a vertical member of another conventional window molding for automobiles.

A first embodiment of a window molding for automobiles has a similar construction to the hereinbefore described conventional window moldings. That is, as shown in FIG. 19, a pair of vertical members V and a horizontal member H are successively molded from a synthetic resin material. For example, the molding can be made from a polyvinyl chloride by an extruder so that it forms one elongate body.

The vertical member V has a standard elongate shape which is integrally made by successively molding the synthetic resin material by the extruder. As shown in FIG. 1, the vertical member is composed of a leg 11 and a vertical head 12. The leg 11 is inserted into the gap between the right or left edge of the front window glass 1, while the head 12 covers the gap. The leg 11 is composed of an inner support 13 sustaining the rear surface of the window glass 1 and a retaining lip 14 elastically touching the inside surface of the window frame 2. An outer support 11a is formed integrally with the leg 11 opposite the inner support 13. The outer support 11a is contacted with the front surface of the window glass 1. The leg 11 is secured by an adhesive to the window frame 2 at the right or left side of the car body.

The vertical head 12V of the vertical member V is composed of an ornamental piece 12b and a seal lip 12a both of which are molded successively on the leg 11. The ornamental piece 12b has an outer surface as seen from the outside of a car when the window molding is assembled to the car body. The seal lip 12a also has an outer surface seen from the outside and is elastically contacted with an outside surface of the window frame 2.

A sustaining lip 31V is a guiding member formed integrally on a base end, i.e., an end near the window from 2 of the outer support 11a. The sustaining lip 31V is extended slantingly toward an inner surface of the ornamental piece 12b. The sustaining lip 31V has its leading end in contact with the inner surface of the ornamental piece 12b so as to elastically hold it from the underside. The outer support 11a, sustaining lip 31V and ornamental piece 12b define a cavity 15V at a glass side of the head 12V. The cavity 15V is continuously extended along the right or left edge of the window glass 1. The cavity 15V also constitutes a guide groove 30 that is placed at the glass side of the head 12V and opened toward the window glass 1.

As shown in FIG. 2, a horizontal member H is composed of a leg 11 and a horizontal head 12H as one body. The leg 11 is inserted into the gap between the upper edge of the window glass 1 and the window frame 2, while the head 12H veils the gap. The leg 11 of the horizontal member H is molded into the same shape as the leg 11 of the vertical member V. The leg 11 is fixed by an adhesive to the window frame 2 at the front edge of the roof 4 of the car body.

The vertical head 12H is obtained, for example, by a process in which an extruded material of the same section as the vertical head 12V is pressed and deformed in its thickness direction just after the extrusion. An outer support 11a is formed on the horizontal head 12H and contacted with the front surface of the window glass 1 opposite an inner support 13 of the leg 11. An ornamental piece 12b of the horizontal head 12H is deformed so as to be placed nearer to the outer support 12 than the ornamental piece 12b of the vertical head 12V. A sustaining lip 31H is deformed or bent at its base end, while being disposed between the outer support 11a and the deformed ornamental piece 12b in a overlapping manner. Namely, the outer support 11a, the deformed sustaining lip 31H and the deformed ornamental piece 12b are piled up on each other on the window glass 1. As a result, in contrast to vertical head 12V, no guide groove 30 opened toward the window glass 1 on the horizontal head 12H is provided. Thus, the horizontal head 12H has only a cavity 15H defined at its frame side by the outer support 11a, the deformed sustaining lip 31H and the deformed ornamental piece 12b. The cavity 15H has a closed section smaller than and different from the section of the cavity 15V of the vertical head 12V.

As a result of the above, the deformed ornamental piece 12b of the horizontal head 12H has its outer surface positioned lower than the ornamental piece 12b of the vertical head 12V relative to the window glass 1. Though not shown, in the first embodiment of the window molding, connected parts between the heads 12V and 12H have their heights varied relative to the window glass 1, gradually from the height of the vertical head 12V to the height of the horizontal head 12H so that there are no lines of discontinuity at the connected parts between the heads 12V and 12H.

Referring to FIGS. 1 and 2, a metal wire 20 is embedded inside through the vertical and horizontal members V and H for the purpose of reinforcement as well as prevention of contraction. A dam 21 seals up an adhesive 5. Here, though the retaining lip 14 and the seal lip 12a are made of the same material as that of the heads 12V and 12H in the illustrated present embodiment, they may be molded of a soft synthetic resin material by a simultaneous extrusion.

Next, a manufacturing process of the first embodiment of the window molding for automobiles as constructed above will be explained.

As shown in FIG. 3, there is arranged a jig 25 and a press roller 26 near an extrusion head 24 of an extruder 23. The press roller 26 is controlled to move between an upper position shown by a phantom line and a lower position shown by a solid line in the figure. The press roller 26 is retracted to the upper position when the vertical members V are extruded from the extrusion head 24. Thus the vertical members V are molded into the same shape as an extruding shape of the extrusion head 24; namely into a shape of a cross section shown in FIG. 1.

The press roller 26 is advanced to the lower position when the horizontal member H is extruded from the extrusion head 24. Thus the horizontal head 12H is pressed down by the press roller 26 while being in a hot and softened state just after the extrusion. At this time, the cavity 15V inside the vertical head 12V permits it to be deformed into the horizontal head 12H. Then, the horizontal head 12H is cooled so as to be kept in its deformed shape. Consequently, the horizontal member H is made into a cross section shown in FIG. 2, so that the horizontal head 12H is provided with the cavity 15H which has the section smaller than and different from the section of the cavity 15V of the vertical head 12V. At the same time, the sustaining lip 31H is layered on the outer support 12 while being deformed or bent at the base end. Further, the deformed ornamental piece 12b is piled on top of the deformed sustaining lip 31H. Here the abovementioned layered state may be better reinforced by use of an undetachable joint rather than the reinforcement obtained by plastic deformation only.

A molded product which has passed through jig 25 and press roller 26 is next transferred to a cooling water tank 27. The product is cooled and hardened so as to be kept in each shape as described above. Subsequently, the molded product is pulled out by a drawing roller 28 and conveyed to a cutter 29 so as to be cut to a predetermined length; namely the total length of the right, left and upper edges of the front window glass 1.

The window molding as constructed above is transported in a car production line and fitted into the gap between the front window glass 1 and the window frame 2 of the car body. In this case, the legs 11 of the vertical and horizontal members V and H are inserted successively into and secured by the adhesive 5 in the gap between the window frame 2 and the right and left and upper edges of the window glass 1. Thus, as shown in FIG. 1, the vertical heads 12V cover the gap at the right and left edges while protruding from the front surface of the window glass 1. The horizontal head 12H seals up the gap at the upper edge while protruding less than the vertical heads 12V from the front surface of the window glass 1.

While the above described window molding is fitted into the gap between the glass 1 and the frame 2 in the car production line, it is possible for the window molding to be mounted on the window glass 1 first, and the above combined parts transported into the car production line thereafter to be assembled to the car body by an automatic assembly machine.

Next described is an operation of the first embodiment of the automobile window molding as constructed above.

Rainwater or windshield washer liquid or the like is swept by the wiper 6 and flows on the front window glass 1 and arrives at the vertical heads 12/V of the vertical members V. Then the rainwater or the like is blocked by the guide groove 30 under the vertical head 12V and kept from going onto the side window 3. Such rainwater is guided downward by the groove 30 along the right and left edges of the window glass 1.

In sum, with the first embodiment of the window molding, the heights of the vertical heads 12V and the horizontal head 12H can easily be changed at the right and left edges and the upper edge of the window glass 1 by a simple manufacturing process. That is, the sustaining lips 31V and 31H that hold the ornamental head 12b have their bent angle varied simply by pressing a head of an extruded molding by the press roller 26. Therefore, the cavity 15V and 15H is deformed to define the cavity 15H on the horizontal head 12H which has the section smaller than and different from the section of the cavity 15V on the vertical head 12V. As a result, contrary to the conventional moldings, there is no need for separately molded parts nor steps to cut part of an extruded window molding so that manufacturing costs can be largely reduced.

Moreover, the rainwater or the like is stopped and flows down along the guide groove 30 at the right and left edges of the window glass 1. Consequently, rainwater or the like is prevented from splashing on the side window 3.

While the first embodiment changes the heights of the vertical heads 12V and the horizontal head 12H by pressing the extruded molding head, a variety of modifications may be used therefor. For instance, the total length of a window molding can be extruded into a section of the first embodiment shown in FIG. 1 and cooled and solidified. Thereafter the ornamental piece 12b and the sustaining lip 31V of the vertical head 12V can be deformed by a hot melt or a high-frequency heating as a secondary process. Then, the deformed sustaining lip 31H and ornamental piece 12b are layered on the outer support 11a of the horizontal head 12H.

Thus, there can be provided a height difference between the vertical heads 12v and the horizontal head 12H. Moreover, molding methods are not limited to the extrusion molding in the first embodiment, and an injection molding may be employed.

The cavity 15V or the guide groove 30 of the vertical heads 12V is not limited to the shape of the channel section in the first embodiment. The guide groove 30 may be formed into a shape of a V section, a semicircular section, or the like, as long as it is able to block and guide the rainwater or the like.

The sustaining lip 31V of the vertical member 12V is not restricted to the one described in the first embodiment. The lip 31V may be arranged, for example, into a shape extending from substantially the center of the outer support 11a toward the ornamental piece 12b, so long as it can support the ornamental piece 12b and define the guide groove 30 opened toward the window glass 1.

The deformed ornamental piece 12b of the horizontal head 12H may be wider than that of the first embodiment so that a leading end thereof touches the glass 1 to veil the outer support 11a and the deformed sustaining lip 31H from the outside. In that case, since a joint line of the layered outer support 11a and ornamental piece 12b is not exposed to the outside, the horizontal head 12H can have an improved appearance.

Moreover, the horizontal head 12H may have a recess provided on each inner surface of the outer support 11a and the ornamental piece 12b at a portion where the deformed sustaining lip 31H is overlapped. In that case, when the horizontal heads 12H is pressed, the deformed sustaining lip 31H is accommodated into the recess and relieved from stress. Then, the outer support 11a, the ornamental piece 12b and the deformed sustaining lip 31H are piled up on each other. As a result, the deformation of the horizontal head 12H is made easier. Furthermore, there is no chance that any shoulders or shrinkages or the like will arise on the outer surface as a design surface of the horizontal head 12H after its deformation.

Furthermore, while in the first embodiment the sustaining lips 31V and 31H are extended from the base end of the outer support 11a, they may alternately be formed to project from near the ornamental piece 12b. Still, it is preferable to project the lips 31V and 31H from about the base end of the outer support 11a from the standpoint of prevention of shrinkages or the like of the design surface.

The outer support 11a, the deformed sustaining lip 31H and the deformed ornamental piece 12b may be layered simply by plastic deformation or bonded into one body by a melting or an adhesive.

Further, it is possible to omit the sustaining lips 31V and 31H in the first embodiment as long as the horizontal head 12H can retain its shape. In this case, the entire cavity 15V, 15H can be used as a guide groove, thereby making it more reliable to block and guide the rainwater or the washer fluid or the like.

Figure 4:
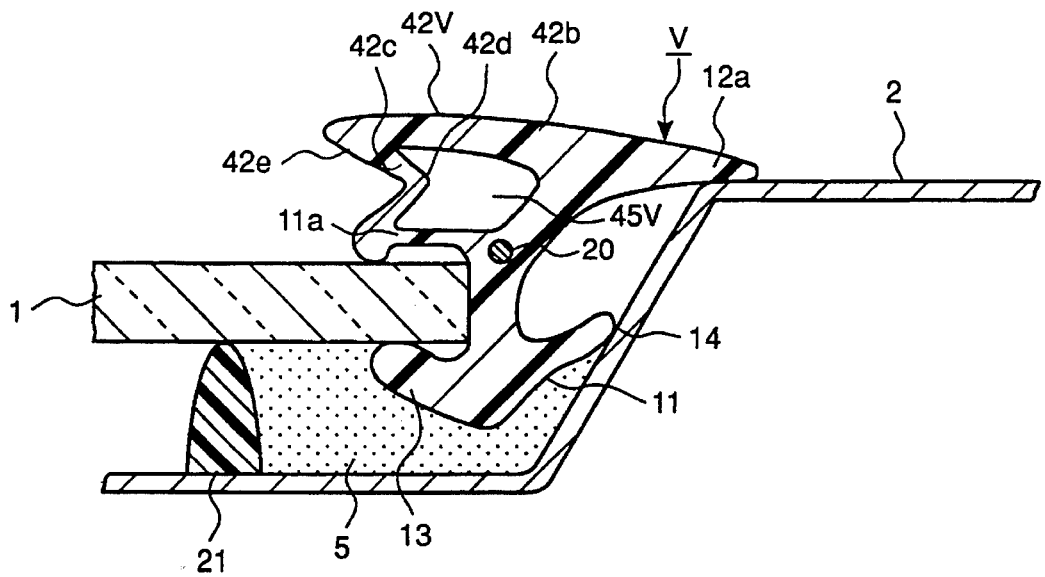
FIG. 4 is a cross sectional view of a vertical member of a second embodiment of an automobile window molding of the present invention in its assembled state.
Figure 5:
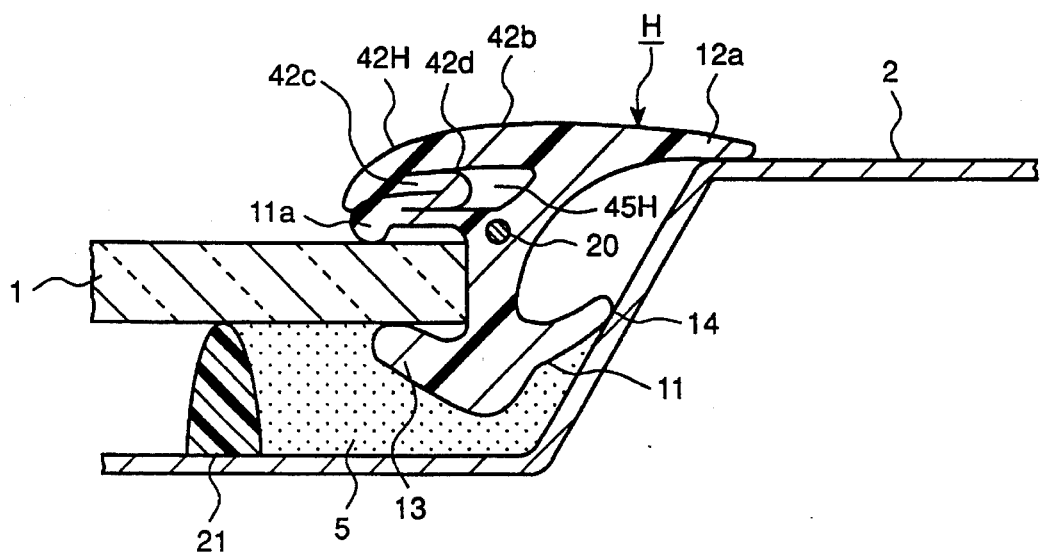
FIG. 5 is a cross sectional view of a horizontal member of a second embodiment of an automobile window molding of the present invention in its assembled state.

FIGS. 4 and 5 show a second embodiment of a window molding for automobiles of the present invention. FIG. 4 illustrates a section of an assembled vertical member, while FIG. 5 illustrates a section of an assembled horizontal member.

The second embodiment of the window molding has a similar structure to the first embodiment as a whole. As shown in FIG. 4, a vertical member V has a leg 11 and a vertical head 42V integrally formed therewith. The vertical head 42V covers the gap between the right or left edge of the front window glass 1 and the window frame 2. An ornamental piece 42b of the vertical head 42V is formed opposite an outer support 11a provided on the leg 11.

A folding piece 42c is molded as a guiding member integrally and successively between a lateral leading end of the ornamental piece 42b. The folding piece 42c has a substantially V-shaped section that is bent inwardly of the vertical head 42V so as to be folded via a corner 42d thereof. Thus, an outside surface of the folding piece 42c defines a guide groove 42e of a substantially V-shaped section that is opened toward the window glass 1 at the glass side of the vertical head 42V. The guide groove 42e is extended along the right or left edge of the window glass 1. In addition, the outer support 11a, the folding piece 42c and the ornamental piece 42b define a cavity 45V of a predetermined closed section at the frame side of the vertical head 42V. The vertical member V also has a seal lip 42a which protrudes toward and elastically contacts the outer surface of the window frame 2.

As shown in FIG. 5, a horizontal member H has a leg 11 and a horizontal head 42H integrally formed therewith. The horizontal head 42H covers the gap between the upper edge of the front window glass 1 and the window frame 2.

The horizontal head 42H is obtained, for example, by pressing and deforming an extruded material of the same shape as the vertical head 42V in its thickness direction. A deformed ornamental piece 42b is provided on the horizontal head 42H so as to be facing the outer support 11a at a nearer position than that of the vertical head 42V. A folding piece 42c is folded at a corner 42d so as to be overlapped between a leading end of the outer piece 11a and a leading end of the deformed ornamental piece 42b. That is, the outer piece 11a, the deformed folding piece 42c and the deformed ornamental piece 42b are piled on each other on the window glass 1. Thus, no guide groove 42e is provided on the glass side of the horizontal head 42H as in the vertical head 42V. Still a closed cavity 45H is defined by the outer piece 11a, the deformed folding piece 42c and the deformed ornamental piece 42b on the frame side of the horizontal head 42H. The closed cavity is deformed into a section smaller than and different from the section of the cavity 45V of the vertical head 42V.

Therefore, an outer surface of the ornamental piece 42b of the horizontal head 42H is positioned lower than an outer surface of the ornamental piece 42b of the vertical head 42V. Moreover, the second embodiment of the window molding varies a height of a joined part between the vertical head 42V and the horizontal head 42H, as in the first embodiment. In other words, the height changes with respect to the window glass 1 gradually from a height of the vertical head 42V to a height of the horizontal head 42H so as not to produce any line of discontinuity at the joined part between the heads 42V and 42H.

The second embodiment of the window molding as constructed above is molded in the same manner as in the first embodiment by use of the arrangement shown in FIG. 3. That is, when the vertical member V is extruded from the extrusion head 24, the press roller 26 is retracted to the upper position so that vertical member V is molded into the section shown in FIG. 4. When the horizontal member H is extruded from the extrusion head 24, the press roller 26 is moved to the lower position, thereby pressing and molding the horizontal head 42H by the press roller 26 into the section shown in FIG. 5. Thus the horizontal head 42H is provided with the deformed cavity 45H of a cross section smaller than and different from the cross section of the cavity 45V of the vertical head 42V. At the same time, the folding piece 42c (to be deformed) of the horizontal head 42H is folded at the corner 42d and overlaps its outer surface, while being piled up on the outer support 11a. Thereafter the deformed ornamental piece 42b is layered on the deformed folding piece 42c.

Afterwards, the window molding is transported in the car production line for cooling in the cooling water tank 27 and cutting by the cutter 29. The molding is then fitted into the gap between the front window glass 1 and the window frame 2. As shown in FIGS. 4 and 5, the vertical heads 42V cover the gap between the right and left edges of the window glass 1 and the frame 2 while protruding rather substantially from the front surface of the window glass 1. On the other hand, the horizontal head 42H closes the gap between the upper edge of the glass 1 and the frame 2, while protruding only slightly from the surface of the window glass 1.

Next described is an operation of the second embodiment of the window glass for automobiles as constructed above.

With the second embodiment of the window molding the cavities 45V and 45H function as deformation permitting members. After the second embodiment of the window molding is secured between the window glass 1 and the window frame 2, rainwater or washer liquid or the like swept by the wiper 6 flows on the window glass 1 and gets to the vertical heads 42V of the vertical members V. The rainwater or the like is blocked by the guide groove 42e arranged at the glass side of the vertical head 42V, and prevented from overflowing onto the side window 3 and drains down along the right and left edges of the window glass 1.

Accordingly, with the second embodiment of the window molding, the horizontal head 42H can be provided with the deformed cavity 45H of a cross section smaller than and different from the cross section of the cavity 45V of the vertical head 42V simply by pressing the head of an extruded molding by the press roller 26, in forming the horizontal member H. Thus, there is provided a height difference between the vertical heads 42V and the horizontal head 42H at the right and left edges and the upper edge of the window glass 1. As a result, contrary to the conventional window molding, there is no need for separately molded parts nor a need for cutting the extruded window molding. Therefore, it is possible to drastically reduce manufacturing costs.

Moreover, the rainwater or windshield washer liquid or the like is stopped and drained along the guide groove 42e at the right and left edges of the window glass 1. Thereby, such rainwater or the like is prevented from running over the vertical heads 42V to go off of the window glass 1 and onto the side window 3 to obstruct a driver's view or make the side window 3 dirty.

Figure 6:
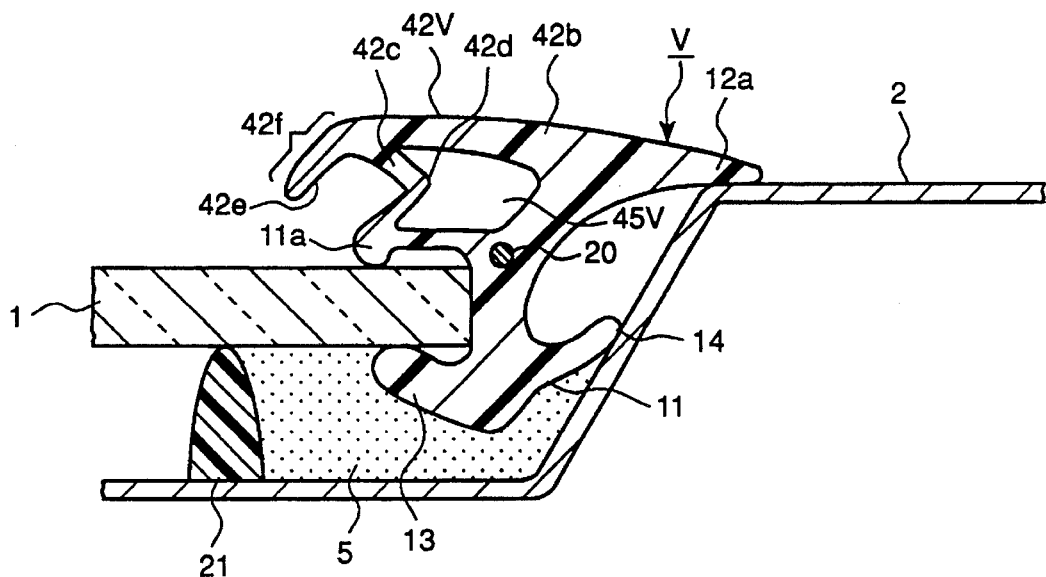
FIG. 6 is a cross sectional view of a vertical member of a third embodiment of an automobile window molding of the present invention in its assembled state.
Figure 7:
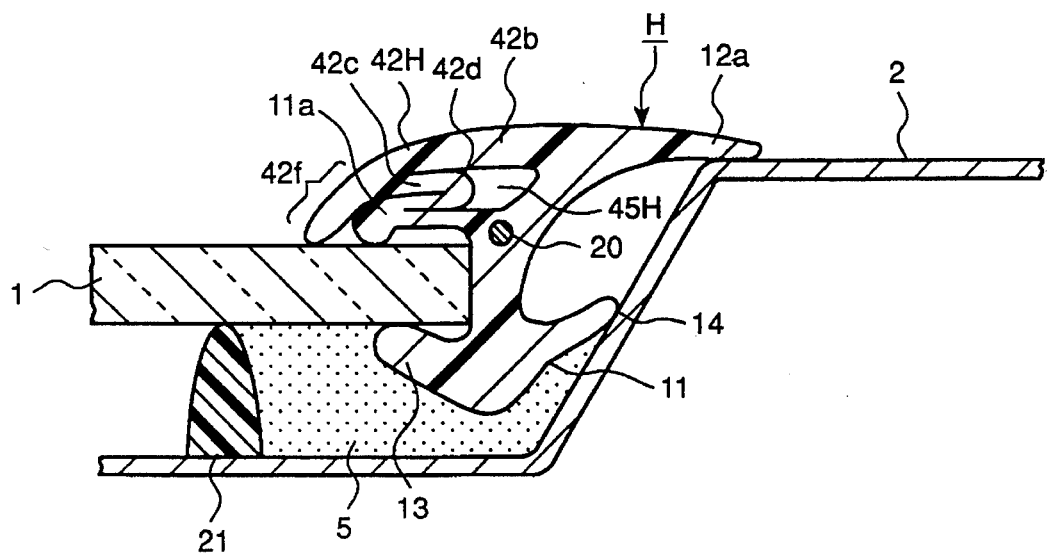
FIG. 7 is a cross sectional view of a horizontal member of a third embodiment of an automobile window molding of the present invention in its assembled states.

FIGS. 6 and 7 show a third embodiment of a window molding for automobiles in its assembled state wherein FIG. 6 illustrates a vertical member while FIG. 7 illustrates a horizontal member.

The third embodiment of the window molding has a veil lip 42f projected integrally from the ornamental piece 42b of the vertical head 42V of the vertical member V. The veil lip 42f makes up part of the design surface of the ornamental piece 42b to widen it toward the front window glass 1. Thus, there is provided a guide groove 42e at the glass side of the vertical head 42V by an inner surface of the veil lip 42f and an outer surface of the folding piece 42c. The guide groove 42e has a channel section that is opened toward the window glass 1. On the other hand, the horizontal head 42H of the horizontal member H has a veil lip 42f projected from the leading end of the deformed ornamental piece 42b toward the window glass 1. The veil lip 42f has its leading end contacted with the front surface of the window glass 1. Thus, the veil lip 42f covers a joint line from the outside which is produced at the overlapping portion of the outer surface of the folding piece 42c.

Accordingly, with the third embodiment of the window molding, the rainwater or the like is blocked and drained by the guide groove 42e at the right and left edges of the window glass 1 as in the above embodiments. In other words, the guide groove 42e of the vertical heads 42V prevents the rainwater or the like from running over the vertical heads 42V off of the window glass 1. Consequently, the rainwater or the like is kept from splashing onto the side window 3.

Moreover, since the guide groove 42e of the vertical head 42V has a larger depth by the width of the veil lip 42f, the guide groove 42e blocks and drains the rainwater or the like on the window glass 1 more reliably.

Furthermore, since the veil lip 42f of the horizontal head 42H conceals the line of discontinuity that appears on the overlapped portion of the deformed folding piece 42c, ornamental effects are improved especially on the horizontal member H.

Figure 8:
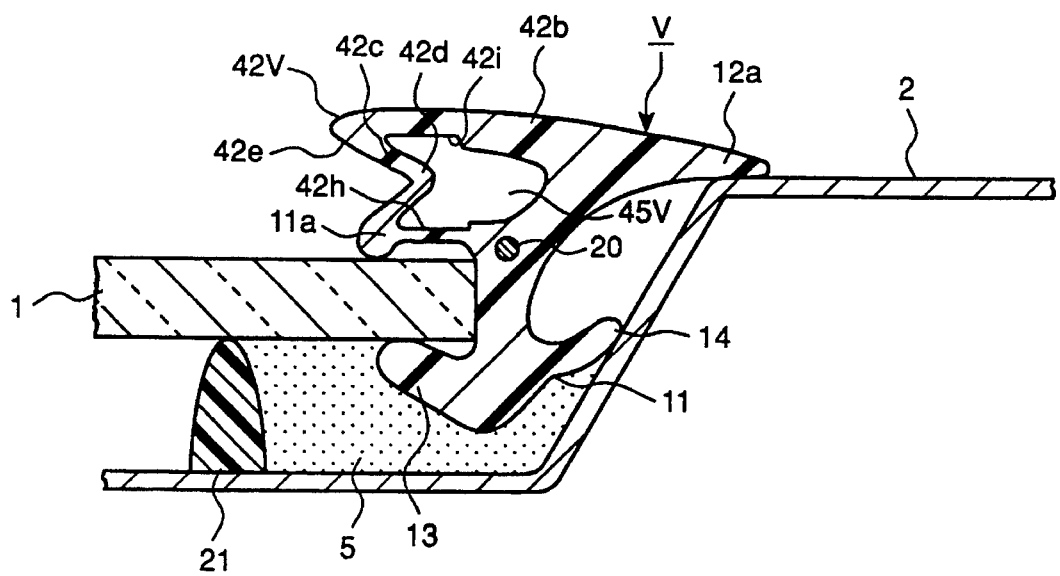
FIG. 8 is a cross sectional view of a vertical member of a fourth embodiment of an automobile window molding of the present invention in its assembled state.
Figure 9:
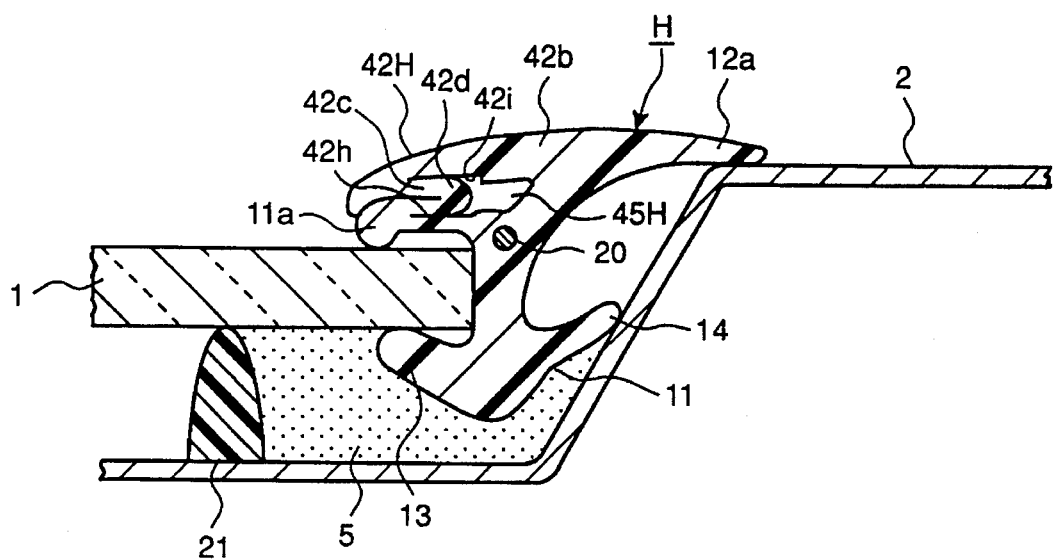
FIG. 9 is a cross sectional view of a horizontal member of a fourth embodiment of an automobile window molding of the present invention in its assembled state.

FIGS. 8 and 9 show a fourth embodiment of a window molding for automobiles. FIG. 8 illustrates a section of a vertical member while FIG. 9 illustrates a section of a horizontal member.

The fourth embodiment of the window molding has accommodating recesses 42h and 42i respectively at an inner surface of the outer support 11a and an inner surface of the ornamental piece 42b. Similarly, the horizontal head 42H is provided with accommodating recesses 42h and 42i respectively at portions of inner surfaces of the outer support 11a and the deformed ornamental piece 42b. The overlapped and deformed molding piece 42c is received into the accommodating recesses 42h and 42i.

Accordingly, in the fourth embodiment, the folding piece 42c is released from stress at the time of overlapping because it is received into the accommodating recesses 42h and 42i. Such overlapping occurs when forming the horizontal head 42H by pressing a head of an extruded molding as in the second embodiment. As a result, the horizontal head 42H is pressed into a smaller thickness and the folding piece is easily deformed. Further, there is no possibility of a stepped portion being produced on the pressed horizontal head 42H due to large thicknesses of the layered outer support 11a, deformed folding piece 42c and ornamental piece 42b.

Figure 10:
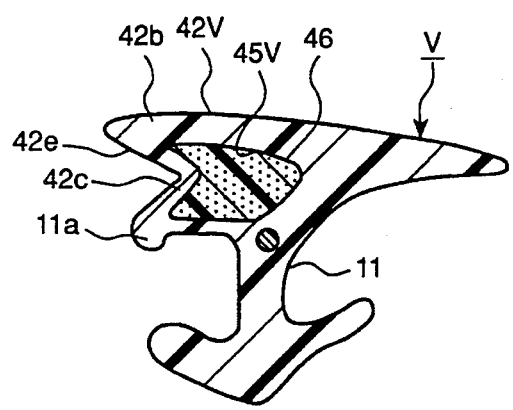
FIG. 10 is a cross sectional view of a vertical member of a fifth embodiment of an automobile molding of the present invention.
Figure 11:
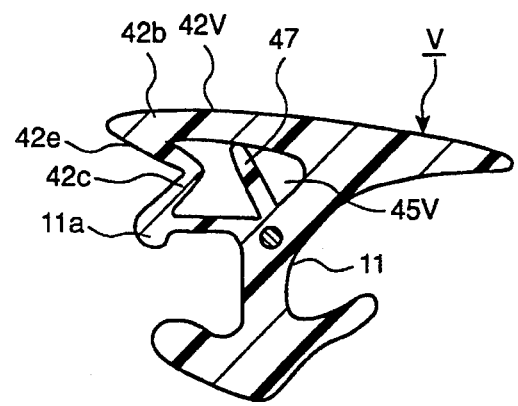
FIG. 11 is a cross sectional view of a vertical member of a sixth embodiment of an automobile window molding of the present invention.

FIG. 10 shows a section of a vertical head in a fifth embodiment of a window molding for automobiles. FIG. 11 shows a section of a vertical head in a sixth embodiment of a window molding for automobiles.

In the fifth embodiment, a shape retainer 46 is disposed inside the cavity 45V from an open end of the vertical head 42V after its molding. The shape retainer 46 may be made of a foamed synthetic resin material that is injected into the cavity 45V, or may alternatively be a separately molded synthetic resin material that is inserted into the cavity 45V.

In the sixth embodiment, a shape retaining rib 47 is integrally molded in the cavity 45V of the vertical head 42V at the time of molding.

With the structures of the above embodiments, the hollow vertical head 42H is held in its standard shape by the shape retainer 46 or the shape retaining rib 47, even in case of using a rather soft molding material for the window molding of the invention. Thus, the surface of the horizontal head 42H, namely the design surface, is free from any deformation when assembled on the car body.

Figure 12:
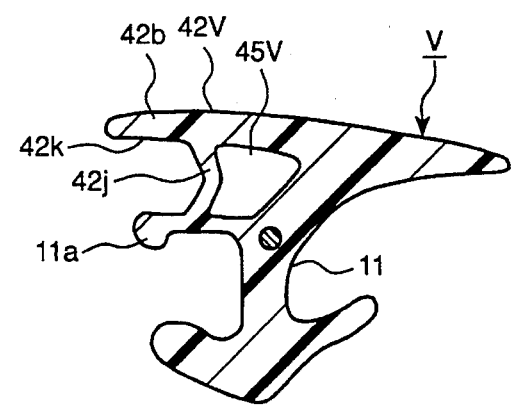
FIG. 12 is a cross sectional view of a vertical member of a seventh embodiment of an automobile window molding of the present invention.

FIG. 12 shows a section of a vertical head of a seventh embodiment of a window molding for automobiles.

In the seventh embodiment, the vertical head 42V is provided with a folding piece 42j as a guiding means which connects the outer support 11a and the ornamental piece 42b at their lateral center or a center in a width direction thereof. Thereby, a guide groove 42k is defined at the glass side of the vertical head 42V by the inner surfaces of the outer support 11a, folding piece 42j and ornamental piece 42b. The guide groove 42k has substantially a channel section that is opened toward the window glass 1.

Accordingly, the guide groove 42k of the seventh embodiment blocks and drains rainwater or the like on the window glass 1 more reliably since the guide groove 42k has a larger depth than that of the second embodiment.

In the above described second to seventh embodiments, the ornamental piece 42b and the folding pieces 42c, 42j of the extruded and cooled vertical head 42V may be deformed by a secondary processing such as a heat press or a high frequency heating. Here the horizontal head 42H may have the deformed folding pieces 42c, 42j and ornamental piece 42b piled up on the outer support 11a by the secondary processing instead of pressing a head of an extruded molding, as in the first embodiment. The pressing of the molding or the secondary processing may alternatively be used in order to make up the height difference between the vertical head 42V and the horizontal head 42H. Of course, an injection molding may be adopted as a molding method for each of the above embodiments of the window moldings.

Moreover, a guide groove is not limited to the above described 42e, 42g, 42k which have a bent, substantially V section, or a channel section shape. The guide groove may alternatively be embodied into a curved section such as substantially a U section or a semicircular section or the like. Any section can be used so long as it can block and drain the rainwater or the like and be bent inwardly at the head at the time of deformation by pressing, etc. Especially in the seventh embodiment shown in FIG. 12, a folding piece may be formed by a substantially linear section. Then the plate like folding piece is constructed so that, when the horizontal head 42H is formed of an extruded head, it is folded inwardly therein. Further, a folding piece may be folded outwardly of the horizontal head 42H as long as it is not exposed outwardly from the head 42H and does not affect the appearance thereof when layered.

Furthermore, in the second to seventh embodiments, the folding piece 42c, 42j may have its overlapped portion reinforced or joined stably by a joint means like a hot melt or an adhesive, in addition to a plastic deformation, as in the first embodiment.

Figure 13:
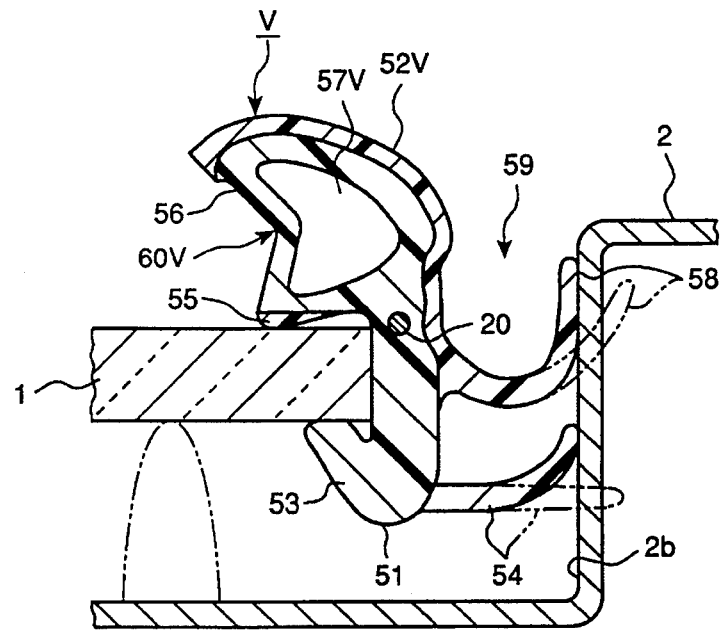
FIG. 13 is a cross sectional view of a vertical member of an eighth embodiment of an automobile window molding of the present invention.
Figure 14:
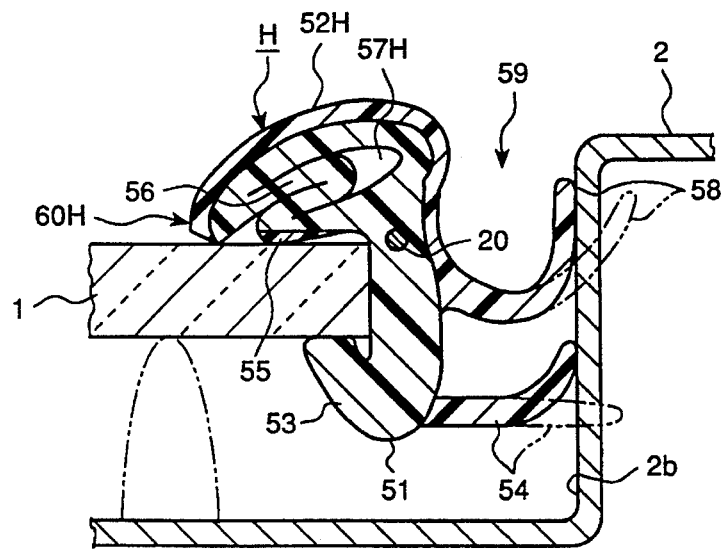
FIG. 14 is a cross sectional view of a vertical member of an eighth embodiment of an automobile window molding of the present invention.

FIGS. 13 and 14 show an eighth embodiment of a window molding for automobiles in its assembled state, wherein FIG. 13 illustrates a section of a vertical head and FIG. 14 illustrates a section of a horizontal head.

The eighth embodiment of the window molding has a similar structure to the above embodiments as a whole. As shown in FIG. 13, a vertical head V is composed of a leg 51 and a pair of vertical heads 52V as one body. The leg 51 is inserted into the gap between the right or left edge of the front window glass 1 and the window frame 2. The vertical head 52V is disposed over the outside perimeter of the right or left edge of the window glass 1. An inner support 53 is projectingly formed on the leg 51 for the purpose of sustaining the rear surface of the window glass 1. A retaining lip 54 protrudes from the leg 51 to elastically touch the inner surface 2b of the window frame 2. An outer support 55 is integrally provided on the leg 51 opposite to the inner support 53. The outer support 55 is contacted with the front surface of the window glass 1. The leg 51, the inner support 53 and the outer support 55 are secured to the window frame 2 through an adhesive at the right and left sides of the car body, as in the previous embodiments. In this embodiment, however, the vertical head 52V has a shape which covers the outer support 55 from above. Thus the vertical head 52V has its upper surface seen as a design surface when assembled to the window glass 1.

A glass side folding piece 56 is successively and integrally formed between a lateral leading end (a glass side end) of the outer support 55 and a lateral leading end of the vertical head 52V. The glass side folding piece 56 constitutes a guiding means and defines a glass side guide groove 60V. Here the folding piece 56 is called a "glass side folding piece", though only one folding piece is provided in the present embodiment, for convenience sake of another embodiment described later. The folding piece 56 is folded inwardly into the vertical head 52V. The vertical head 52V has its projecting state adjusted in relation to the front surface of the window glass 1 by properly changing a state of a folded portion of the folding piece 56. The folding piece 56 is extended along the right or left edge of the window glass 1 at the glass side of the vertical head 52V so as to be opened toward the glass 1. A cavity 57V of a fixed closed section is provided on the frame side of the vertical head 52V by the vertical head 52V, the outer support 55 and the folding piece 56.

A seal lip 58 is successively formed on the frame side of the leg 51 at a position lower than the vertical head 52V. The seal lip 58 has an upper surface stepped relative to the design surface of the vertical head 52V. Thus the upper surface thereof is seen as a design surface when the window molding is assembled. The seal lip 58 is elastically contacted with the inner surface of the window frame 2. The seal lip 58 defines a conduit 59 at the frame side of the vertical head 52V. The conduit 59 has a substantially channel shaped section that is opened upwardly and extends along the right or left edge of the window glass 1. There is provided a surface layer of the same soft synthetic resin material from the design surface of the vertical head 52V to the design surface of the seal lip 58. Thus, the surface layer exhibits a single design surface of uniform texture.

As shown in FIG. 14, a horizontal member H is composed of a leg 51 and a horizontal head 52H as one body. The leg 51 is inserted into the gap between the upper edge of the window glass 1 and the window frame 2. The horizontal head 52H is placed over the upper edge of the glass 1. The leg 51 has a similar construction to the leg 51 of the vertical member V. Namely, it has an inner support 53, a retaining lip 54 and an outer support 55 formed thereon. The leg 51, the inner support 53 and the retaining lip 54 are fixed to the window frame 2 by an adhesive at the front edge of the roof 4 of the car body.

The horizontal head 52H is obtained by pressing and deforming a head of the same shape as the vertical head 52V in its thickness direction, just after its extrusion. Namely, the horizontal head 52H is faced to the outer support 55 at a nearer position than the vertical head 52V. The glass side folding piece 56 is folded at its corner to be overlapped between the leading ends of the outer support 55 and the horizontal head 52H, thus making up a deformed glass side folding piece 60H. That is, the deformed horizontal head 52H, the outer support 55 and the folding piece 56 are piled up on each other on the window glass 1. Accordingly, no guide groove exists at the glass side of the horizontal head 52H as with the glass side guide groove 60V defined by the glass side folding piece 56. Thus, there is provided only a deformed cavity 57H at the frame side of the horizontal head 52H by the deformed horizontal head 52H, the outer support 55 and the deformed folding piece 60H. The deformed cavity 57H has a closed section smaller than and different from the section of the cavity 57V of the vertical head 52V.

Thereby the upper surface as the design surface of the horizontal head 52H is positioned relatively lower than the upper surface as the design surface of the vertical head 52V with respect to the window glass 1. The eighth embodiment of the window molding makes the height of a jointed part of the heads 52V and 52H vary relative to the window glass 1. Namely, the height varies gradually from a height of the vertical head 52V to a height of the horizontal head 52H, as in the above embodiments, so as not to produce a line of discontinuity as the joined part.

A seal lip 58 is successively formed on the frame side of the leg 51 at a position lower than the horizontal head 52H, as with the vertical head 52V. The seal lip 58 has an upper surface as a design surface stepped relative to the design surface of the horizontal head 52H and seen when the window molding is assembled. The seal lip 58 is elastically contacted with the inner surface 2b of the window frame 2. The seal lip 58 defines a conduit 59 of a channel section shape opened upwardly between the window frame 2 and the horizontal head 52H. The conduit 59 is extended along a full length of the vertical heads 52V and the horizontal head 52H. A surface layer of the same soft synthetic resin material constitutes a single design surface of uniform texture from the design surface of the horizontal head 52H to the design surface of the seal lip 58.

In the illustrated embodiment, a soft synthetic resin material makes up a lower part of the leading end of the outer support 55 which touches the window glass 1, the retaining lip 54, the seal lip 58 and the above mentioned surface layer over the design surfaces from the heads 52V and 52H to the seal lip 58. The other part of the leg 51 and the heads 52V and 52H are formed of a hard synthetic resin material by a simultaneous extrusion with the soft synthetic resin material. Otherwise, the window molding may be made of a soft synthetic resin material, for example, at least at a part of the contact surface touching the window glass 1 or the window frame 2. The other part may be made of a hard synthetic resin material.

The eighth embodiment of the window molding as constructed above is molded by the arrangement of FIG. 3 as in the same manner as the first embodiment. That is, when the vertical heads V are extruded from the extrusion head 24, the press roller 26 is retracted to the upper position, thereby molding a head of a section as shown in FIG. 13. When the horizontal head 52H is extruded from the extrusion head 24, the press roller 26 is returned to the lower position, thus pressing to mold the horizontal head 52H of a section shown in FIG. 14. Thereby the horizontal head 52H is formed with a deformed cavity 57H of a cross section smaller than and different from the section of the cavity 57V of the vertical head 52V. At the same time, the folding piece 56 is folded at the corner to have the outer surface overlapped, thus making up the deformed folding piece 60H, while piled up on the outer surface 55.

After being cooled in water tank 27 and cut by cutter 29, the window molding is transported in the car production line and fitted into the gap between the window glass 1 and the window frame 2 of the car body. In this case, legs 51 of heads 52V and 52H are successively inserted into to the gap between the right and left and upper edges of the window glass 1 and the window frame 2. Then the molding is secured to the window frame 2 by an adhesive. Thus, as shown in FIG. 13, the vertical heads V are disposed on the right and left edges of the window glass 1, while projected high from the front surface thereof. Each vertical head 52V has the seal lip 58 elastically touching the inner surface of the window frame 2 so as to cover the gap and define. the conduit 59 together with the window frame 2. on the other hand, as shown in FIG. 14, the horizontal head 52H is disposed on the upper edge of the window glass 1, while protruding slightly from the front surface thereof. The horizontal head 52H has the seal lip 58 elastically touched with the inner surface 2b of the window frame 2 so as to cover the gap. Thus the seal lip 58 and the window frame 2 define a conduit 59 which is continuously formed with the conduit 59 of the vertical heads 52V.

Next described is the operation of the eighth embodiment of the window molding for automobiles as constructed above.

With the eighth embodiment of the window molding, where the vertical heads 52V protrude relatively far and the horizontal head 52H protrudes relatively little from the window glass 1, the cavity 57V functions as a deformation permitting means. With the eighth embodiment of the window molding assembled between the window glass 1 and the frame 2, when the rainwater or the like is swept by the wiper 6, rainwater or the like flows onto the window glass 1 and reaches the vertical heads 52V. Then the rainwater or the like is blocked by the glass side folding piece 56 as the glass side guide groove 60V, which is placed on the glass side of the vertical head 52V. Thus the rainwater is kept from overflowing into the side window 3 and drains downward by the folding piece 56 as the guide groove 60V along the right and left edges of the window glass 1.

In case rainwater on the roof 4 of the car body is advanced toward the window glass 1 when stopping the car, the rainwater arrives at horizontal head 52H and is then blocked by the conduit 59 of the horizontal member H that is positioned at the frameside of the horizontal head 52H. Thus, rainwater is prevented from further advancing onto the window glass 1 and is guided in the horizontal direction along the conduit 59. Moreover, when the rainwater reaches the conduit 59 of the vertical members V, it is drained downward along the right and left edges of the window glass 1.

Accordingly, with the eighth embodiment of the window molding, it is easy to provide the horizontal head 52H with the deformed cavity 57H of the section smaller and different from the section of the cavity 57V of the vertical head 52V. More specifically, a simple method of pressing the head of an extruded molding (to be the vertical head 52V) by the press roller 26 is used in manufacturing the horizontal head 52H. At the same time, a height difference can be easily obtained between the heads 52V and 52H at the right and left and upper edges of the window glass 1. Therefore, contrary to the conventional molds, extra processes are unnecessary for molding vertical members V and a horizontal member H separately and joining them by an additional joint member that is also separately molded. Thus manufacturing costs can be greatly reduced.

Moreover, the rainwater or the like is kept from flowing on the window glass 1 at the right and left edges thereof by the folding piece 56 as the guide groove 60V. The water is drained downward along the folding piece 56, and as a result, the rainwater or the like is prevented from running over the vertical heads 52V out of the window glass 1. Therefore, there is no possibility that the rainwater or the like will splash onto the side window 3 placed next to the front window glass 1. Furthermore, even in the instances in which the rainwater on the roof 4 of the car body goes down to the front window glass 1 upon stopping the car, such rainwater is stopped by the conduit 59 of the horizontal member H. Then, the rainwater is guided horizontally along the conduit 59, and drained downward along the conduit 59 of the vertical members V. Thus, the rainwater on roof 4 does not run over the horizontal head 52H nor flow inside the front window glass 1 at the time of breaking or slowing the car. Consequently, rainwater, mud, and the like is kept from splashing onto the window glass 1, and obstruction of the driver's view and discomfort of the people in the car is avoided.

In addition, the horizontal head 52H is deformed by pressing just after extrusion so as to form the deformed folding piece 60H. Therefore it projects only slightly and smoothly from the front surface of the window glass 1. Thus the horizontal head 52H has no adverse influence on the aerodynamic characteristics of the car. Further, the vertical heads 52V protrude rather considerably from the front surface of the window glass 1 with the glass side folding piece 56 constituting the glass side guide groove 60V. Thus, vertical heads 52V effectively block rainwater or the like from running from the front window glass 1 onto the side window 3.

While the eighth embodiment has the glass side folding piece 56 connecting the leading ends of the vertical head 52V and the outer support 55, the folding piece 56 may join them at an inward position with respect to the leading ends, e.g. substantially at their lateral center. Further, the folding piece 56 may be formed into other sections than the illustrated V section, for example, into a U section, as long as it is foldable.

Figure 15:
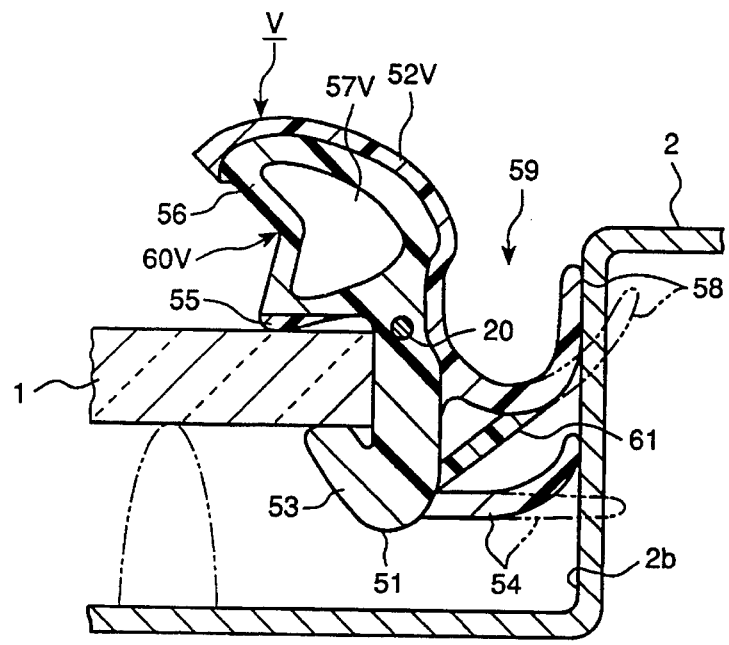
FIG. 15 is a cross sectional view of a vertical member of a ninth embodiment of an automobile window molding of the present invention.

FIG. 15 shows a section of a vertical member of a ninth embodiment of a window molding for automobiles.

As illustrated in the figure, the ninth embodiment of the window molding connects integrally a lower end of the leg 51 and the leading end of the seal lip 58 by a restraining joint 61. The restraining joint 61 is simultaneously extruded together with and along the full length of the vertical members V and the horizontal member H. The horizontal head 52H is extruded into the same shape as the vertical head 52V, and pressed thereafter in its thickness direction as in the above embodiments.

Accordingly, since the restraining joint 61 connects integrally the lower end of the leg 51 and the leading end of the seal lip 58, the seal lip 58 is prevented from moving away from the leg 51 and moving upwardly from a fixed position where it elastically contacts the inner surface 2b of the window frame 2. Particularly, the seal lip 58 is applied with such stress so as to be bent upwardly in case the window molding is curved at circumferential corners of the window glass 1. Still, the restraining joint 61 keeps the seal lip 58 from being curved upwardly so as to keep its elastic contact with the window frame 2. Therefore, the seal lip 58 is always elastically contacted with the inner surface 2b of the window frame 2 in a stable manner. Thus, the conduit 59 is formed between the heads 52V and 52H and the window frame 2. As a result, no space exists between the mold and the inner surface 2b of the window frame 2 even when the seal lip 58 turns upwardly at a curved section or corners of the window glass 1. Thus, a good appearance is maintained on the periphery of the window glass 1, and intrusion of rainwater through such space between the glass 1 and the frame 2 is prevented.

Figure 16:
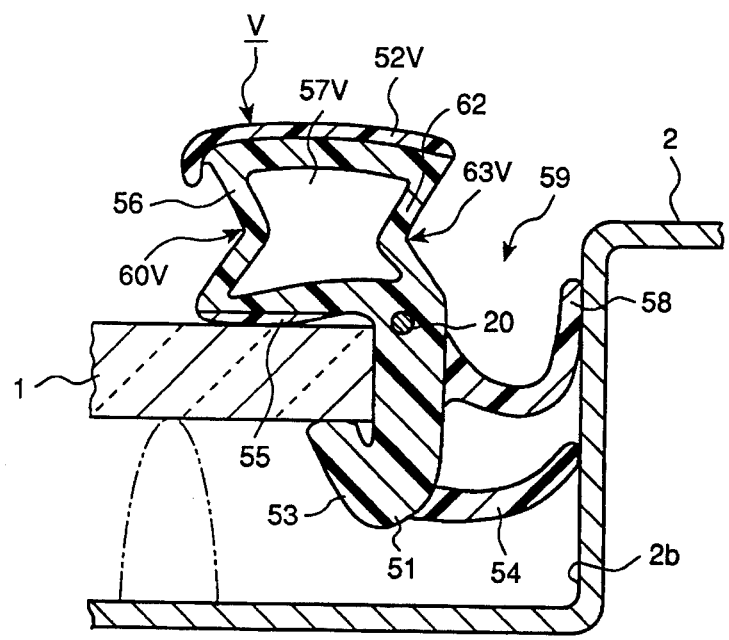
FIG. 16 is a cross sectional view of a vertical member of a tenth embodiment of an automobile window molding of the present invention.
Figure 17:
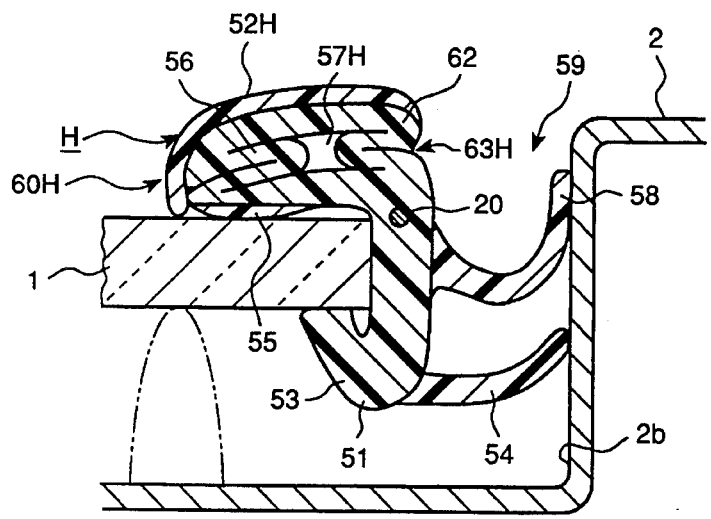
FIG. 17 is a cross sectional view of a vertical member of a tenth embodiment of an automobile molding of the present invention.
Figure 18:
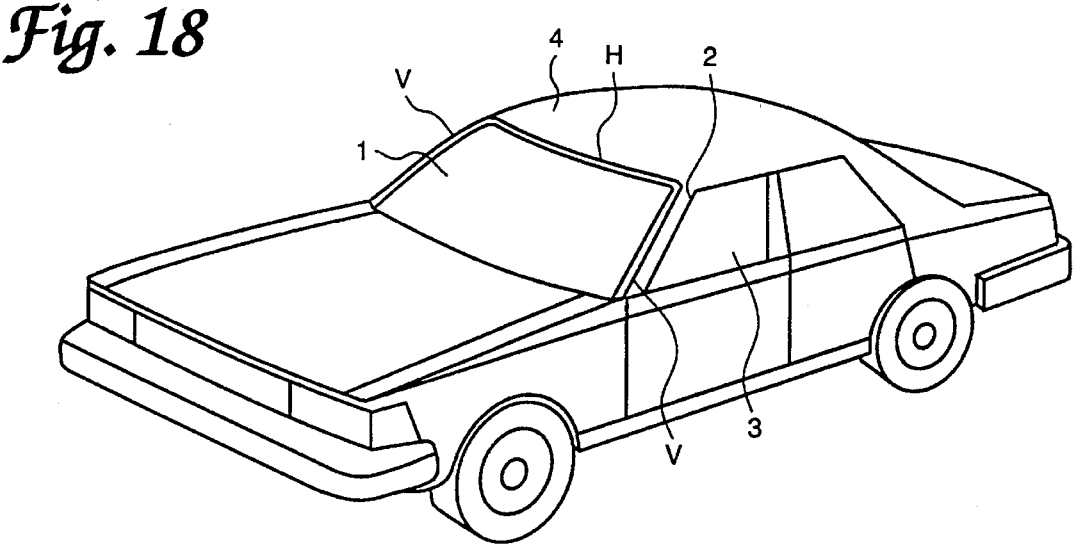
FIG. 18 is a schematic view of a window molding for automobiles fitted into a gap between a front window glass and a window frame.

FIGS. 16 and 17 show a tenth embodiment of a window molding for automobiles of the invention in its assembled state, wherein FIG. 16 illustrates a section of a vertical member, while FIG. 17 illustrates a section of a horizontal member.

As shown in the figures, the tenth embodiment of the window molding is provided with a frame side folding piece 62 changing its bent state according to peripheral positions of the glass 1, in addition to the glass side folding piece 56 of the eighth and ninth embodiments.

The frame side folding piece 62 connects integrally the base end of the outer support 55 and the base end of the vertical head 52V in the vertical member V. On the other hand, the glass side folding piece 56 connects integrally the leading end of the outer support 55 and the leading end of the vertical head 52V. The frame side folding piece 62 is bent inwardly of the vertical head 52V into a substantially V shaped section while facing the glass side folding piece 56.

Thereby a cavity 57V of a predetermined closed section is defined at the frame side of the vertical head 52V by the outer support 55, the glass side folding piece 56, the vertical head 52V and the frame side folding piece 62. The frame side folding piece 62 has an outside surface of a V section opened toward the frame 2 so as to form a frame side guide groove 63V. A conduit 59 of a section opened upwardly is defined at the frame side of the vertical head 52V by the outside surface of the frame side folding piece 62, the design surface of the seal lip 58, and the inner surface 2b of the frame 2 that is continuous therewith. The conduit 59 is extended along the right or left edge of the window glass 1.

The horizontal member H has the horizontal head 52H extruded into the same shape as the vertical head 52V and pressed thereafter in its thickness direction, as in the above embodiments.

Referring to FIG. 17, the horizontal member H has the glass side folding piece 56 folded at its corner and layered between the leading ends of the outer support 55 and the deformed horizontal head 52H, thus constituting a deformed glass side folding piece 60H. The frame side folding piece 62 is folded at its corner and overlapped between the base ends of the outer support 55 and the deformed horizontal head 52H, thus constituting a deformed frame side folding piece 63H. Accordingly, there is no glass side guide groove provided by the folding piece 56 as in the vertical head 52V. Then there is formed only a deformed cavity 57H of a closed section smaller than and different from the section of the cavity 57V of the vertical member V at the frame side of the horizontal head 52H by the outer support 55, the deformed glass side folding piece 60H, the deformed horizontal head 52H and the deformed frame side folding piece 63H.

The tenth embodiment molds the vertical members V of the section shown in FIG. 16 and the horizontal member H of the section shown in FIG. 17 utilizing the extruder as in the above embodiments. At the time of molding, the frame side folding piece 62 can be bent to change its folding state through the corner, in addition to the glass side folding piece 56 properly varying its bent state through the corner. Thus it is easy to change or adjust the height of the heads 52V and 52H that project from the front surface of the window glass 1. Namely, in the tenth embodiment of the window molding, in case of protruding the vertical heads 52V high and the horizontal head 52H low from the window glass 1, the cavity 57V serves as a deformation permitting means, as in the eighth and ninth embodiments. In addition thereto, the frame side folding piece 62 acts as a height adjusting means to change the height of the heads 52V and 52H that are projected from the window glass 1.

The window molding has the glass side guide groove 60V formed at the glass side of the vertical member V, by the folding piece 56, when assembled between the glass 1 and the frame 2. On the other hand, there is no such groove, but rather a deformed folding piece 60H provided on the horizontal member H. Moreover, the conduit 59 is provided successively at the frame side of the vertical and horizontal heads 52V and 52H. Accordingly, with the window molding assembled, the rainwater or the like runs on the window glass 1 to the vertical members V, and is blocked by the glass side folding piece 56 defining the glass side guide groove 60V, that is layered at the glass side along the vertical member V. Thus, the rainwater is kept from overflowing into the side window 3 and drained downward along the right and left edges of the window glass 1.

In addition, rainwater from the roof 4 is prevented from going down toward the window glass 1 by conduit 59 arranged along the frame side of the horizontal head 52H of the horizontal member H. The rainwater is guided horizontally along the conduit 59 of the horizontal member H, and drained along the continuously formed conduit 59 of the vertical member V.

Accordingly, with the tenth embodiment of the window molding, the cavity 57H can be provided on the horizontal member H by a simple method, namely by pressing a head of an extruded molding (the horizontal head 52H) to be deformed into the section smaller than and different from the section of the cavity 57V of the vertical member V. Moreover, in this case, the frame side folding piece 62 functions as a means for adjusting the height of the horizontal head 52H protruding from the window glass 1. These structures make it easier to change the heights of the heads 52V and 52H at the right and left edges and the upper edge of the window glass 1. As a result, the present embodiment does not require such processes as molding the vertical members V and the horizontal member H separately and joining them by an additional joint member molded separately therefrom, contrary to the prior art. As a consequence, manufacturing costs are greatly reduced.

Moreover, the folding piece 56 or the guide groove 60V blocks and drains rainwater, or the like, downwardly at the right and left edges of the window glass 1, so that the rainwater wiped by wiper 6 is kept from running over the vertical members V.

Furthermore, the horizontal member H improves the aerodynamic characteristics of the car since it protrudes only slightly from the window glass 1. Moreover, the horizontal head 52H forms a smooth transition from the front surface of the window glass 1 to the window frame while having its opposite ends layered on the outer support 55 and the deformed glass side folding piece 60H and the deformed frame side folding piece 63H. The vertical members V prevent the rainwater from running from the front window glass 1 to the side window 3, since the vertical heads 52V protrude rather extensively from the window glass 1.

While the frame side folding piece 62 joins the horizontal head 52H and the outer support 55 at their base ends, it may join them at another position, e.g. at their lateral centers. Moreover, the frame side folding piece 62 may be formed into some other section than the V section; such as a U section or the like, so long as it is foldable.

The preferred embodiments described herein are illustrative and not restrictive, and the scope of the invention as indicated in the appended claims is intended to include all variations which come within the meaning of the claims.

What is claimed is:

1. A window molding for automobiles comprising:

an elongate leg fitted into a gap between a perimeter of a front window glass and a window frame, said perimeter comprising at least side edges and an upper edge of the front window glass;

an inner support positioned at a first location on the leg and sustaining a rear surface of the front window glass;

an outer support positioned at a second location on the leg and spaced from said inner support so as to bear on a front surface of the front window glass, the inner support and the outer support cooperatively sandwiching the perimeter of the front window glass;

a head disposed at one end of the leg, said head having a lateral portion thereof extending over said outer support so as to substantially cover the outer support;

a web member interconnecting the lateral portion of the head and the outer support, said web member being deformed according to a respective position along the perimeter of the front window glass so that the distance between the lateral portion of the head and the outer support varies according to the respective position along the perimeter of the front window glass; and a veil lip disposed on the lateral portion of the head, said veil lip being spatially separated from the front window glass and forming an obtuse angle with the lateral portions of the head so as to extend downwardly toward the front window glass at least adjacent the side edges of the front window glass so that the veil lip and said web member together define a groove opening toward the front window glass adjacent the side edges, said web member being deformed at the upper edge of the front window glass to shorten the distance between the lateral portion of the head and the outer support so that the veil lip has a portion thereof bearing on the front window glass adjacent the upper edge of the front window glass, said web member being comprised of first and second portions joined in an angular relation to one another, said first portion connected to the lateral portion of the head, said second portion connected to the outer support, and said veil lip being oriented in a normal uncompressed position substantially parallel to the second portion so that the first portion, the second portion and the veil lip provide said groove with an open-sided, substantially parallelogram-shaped cross-section.

2. The window molding for automobiles as claimed in claim 1, wherein said web member is shaped such that the distance between the lateral portion of the head and the outer support is at a maximum at the side edges of the front window glass and at a minimum at the upper edge of the front window glass.

3. The window molding for automobiles as claimed in claim 2, wherein said web member is shaped such that the distance between the lateral portion of the head and the outer support changes gradually from the maximum to the minimum at junctions of the side edges and the upper edge of the front window glass.

4. The window molding for automobiles as claimed in claim 1, wherein the head further includes a seal lip extending away therefrom and contacting the window frame, the seal lip covering at least a portion of the gap between the perimeter of the front window glass and the window frame.

5. The window molding for automobiles as claimed in claim 4, wherein said web member has a normally bent shape, said normally bent shape being such that the distance between the lateral portion of the head and the outer support is at a maximum at the side edges of the front window glass, said web member having a deformed bent shape along the upper edge of the front window glass in which it is folded between the outer support and the lateral portion of the head so as to make the distance therebetween at a minimum.

6. The window molding for automobiles as claimed in claim 5, wherein the veil lip is integrally formed with the lateral portion of the head.

7. The window molding as claimed in claim 1, further comprising a cavity being defined by the lateral portion of the head, the first and second portions of the web member, and the outer support.

8. The window molding as claimed in claim 7 wherein the veil lip has a main portion thereof being of a substantially same thickness as a thickness of the lateral portion of the head, and wherein the veil lip has a leading end portion thereof being of a smaller thickness than the thickness of the lateral portion of the head.

9. Strip molding for use about the perimeter of automobile windows, having vertical and horizontal edges, to seal a gap existing between such edges and an automobile window frame comprising:

a body including a head, a base and an interconnecting leg that together cooperatively sandwich a perimeter of an automobile window and fill a gap defined between the perimeter of the window and a window frame;

said head comprising an inner member, an outer member and an interconnecting web;

said inner member being in sealing contact with the window; and said outer member having an edge overlying the window comprised of an outwardly and downwardly projecting veil lip, said veil lip being in contact with said window adjacent the horizontal edges of the window and being spaced from and angled downwardly toward the window adjacent the vertical edges thereof so that along the vertical edges the web and veil lip cooperate to form a channel for directing fluid flow therealong, said interconnecting web being comprised of first and second portions joined in an angular relation to one another, said first portion connected to a lateral portion of the head, said second portion connected to the outer member, and said veil lip adjacent the vertical edges of the window being oriented in a normal uncompressed position substantially parallel to the second portion so that the first portion, the second portion and the veil lip provide said channel with an open-sided, substantially parallelogram-shaped cross-section.

* * * * *